Patented Jan. 10, 1950

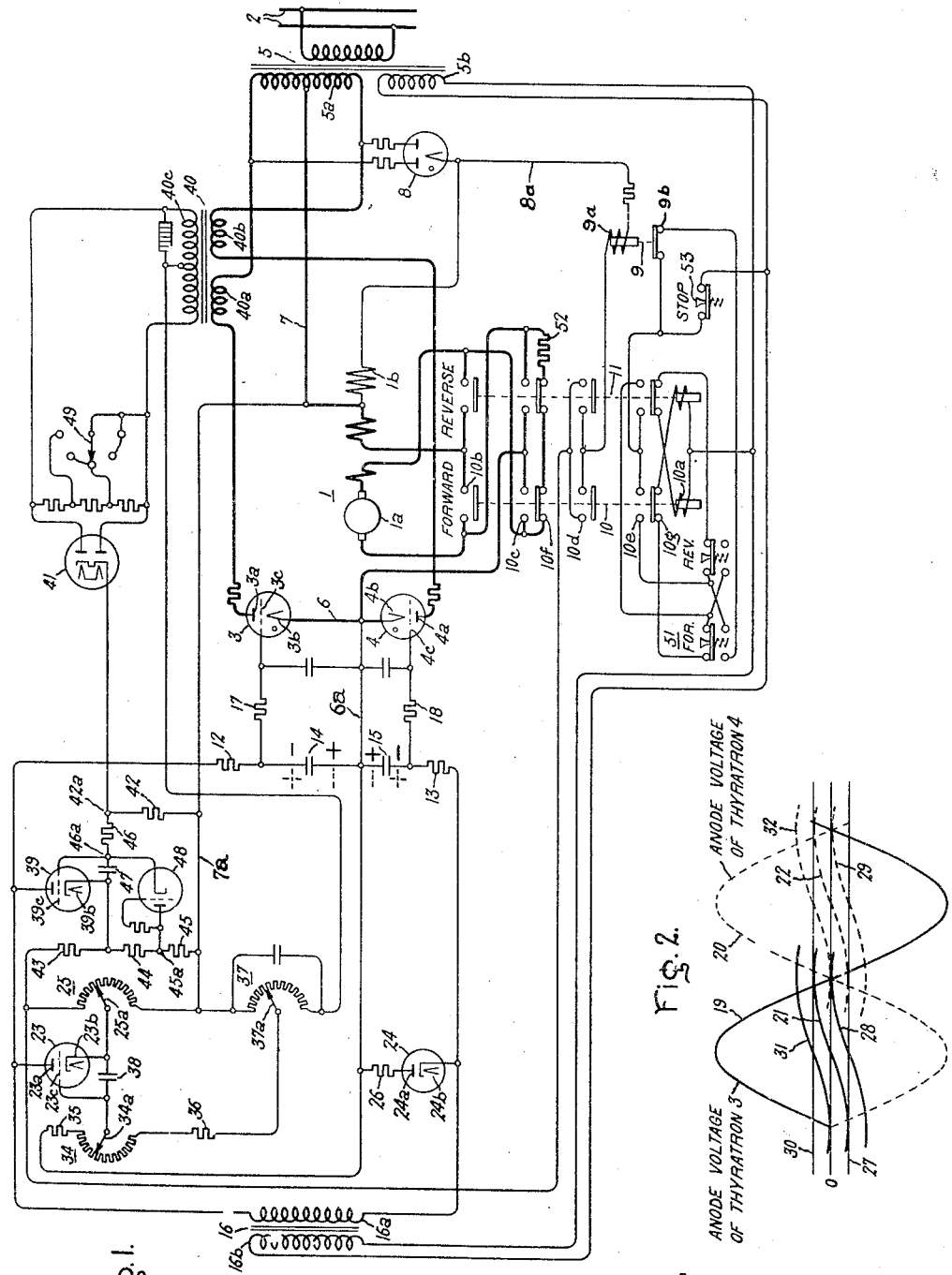

2,494,340

UNITED STATES PATENT OFFICE 2,494,340

ELECTRONIC CONTROL SYSTEM FOR DYNAMOELECTRIC MACHINES

Henry H. Leigh, Scotia, N. Y., assignor to General Electric Company, a corporation of New York Application June 7, 1944, Serial No. 539,053

10 Claims. (Cl. 318—345)

1

This invention relates to control systems, more particularly to systems for controlling the operation of electric translating devices, and it has for an object the provision of a simple, reliable, inexpensive, and improved control system of this character.

More particularly, the invention relates to control systems in which electric valves are utilized as a controlled rectifier between an A.-C. source and a D.-C. translating device.

In carrying the invention into effect in one form thereof, the controlled rectifier comprises a pair of electric valves each provided with an anode, a cathode, and a control grid and connected to an anode transformer as a biphase, half-wave rectifier. A component of alternating voltage, which is dephased with respect to the anode voltage, is supplied to the grid by means of a resistance-reactance circuit which is supplied from the source of anode voltage. This circuit includes a pair of capacitors, of which each is connected between the cathode and grid of a corresponding electric valve. The output current of the valves is controlled by varying the firing point, and this is accomplished by supplying a variable component of direct voltage to the grid. This direct voltage component is produced by means of a pair of control electric valves, of which each is connected in parallel circuit relationship with a corresponding one of the capacitors. This component is varied by varying the relative conductivities of the two control valves.

For a better and more complete understanding of the invention, reference should now be had to the following specification and to the accompanying drawing of which Fig. 1 is a simple, diagrammatical illustration of an embodiment of the invention; and Fig. 2 is a chart of characteristic curves which facilitate an understanding of the operation.

Referring now to the drawing, a translating device such as a D.-C. motor 1 having an armature 1a and a shunt field winding 1b is to be supplied from an A.-C. source 2. A direct voltage is supplied to the armature 1a of the motor by means of a controlled rectifier illustrated as a pair of half-wave triode rectifier valves 3 and 4 supplied from a supply transformer 5, of which the primary winding is connected across the A.-C. source 2. The anodes 3a and 4a of the valves are connected to opposite terminals of the secondary winding 5a of the supply transformer, and the cathodes 3b and 4b are connected together to a conductor 6. Thus, the conductor 6 is the positive bus of the rectified voltage, and the conductor 7 which is connected to the center tap of the secondary winding 5a becomes the negative bus.

For the purpose of supplying a direct voltage to the shunt field winding 1b, a rectifier valve 8 is provided. The valve 8 is illustrated as a twin anode phanotron valve, of which the anodes are connected to opposite terminals of the secondary winding 5a of the supply transformer. As thus connected, the rectifier 8 rectifies both half-waves of the alternating voltage, and the cathode is the positive bus. One terminal of the shunt field winding 1b is connected to the cathode of rectifier 8 and the other terminal is connected to the conductor 7 which, as previously pointed out, is connected to the center tap of the secondary winding of the supply transformer. Thus, conductor 7 is also the negative bus of the rectifier 8. In addition to supplying the excitation current for the shunt field winding, the rectifier 8 supplies the current for operating a small sequencing contactor 9, and it also furnishes a reference voltage for controlling the operation of the control valves 3 and 4.

One terminal of the armature 1a of the motor is connected to the negative bus 7, and the other terminal is connected through the contacts of one or the other of a pair of reversing contactors 10 and 11 to the positive bus 6.

The valves 3 and 4 are preferably thyratrons. The rectified output current of the thyratrons is controlled by varying the firing point; i. e., the instant in the positive half-cycle of applied anode voltage at which the grid voltage becomes less negative than the critical grid voltage. For the purpose of varying the firing point of valves 3 and 4, a voltage is supplied to the grids 3c and 4c which has two components of which one is a dephased lagging alternating voltage of fixed magnitude and the other is a direct voltage of variable magnitude and reversible polarity. The alternating voltage component is supplied to the grids 3c and 4c by means of a resistance-reactance circuit which comprises the resistors 12 and 13 and the capacitors 14 and 15. This resistance-reactance circuit is supplied from the secondary winding 16a of a transformer 16 of which the primary winding 16b is connected to be supplied by a secondary winding 5b of the supply transformer 5. This resistance-reactance circuit is readily traced from the upper terminal of the secondary winding 16a through the resistor 12, capacitor 14, bus 6, capacitor 15, and resistor 13 to the lower terminal of the secondary winding 16a. One terminal of the capacitor 14 is connected through a resistor 17 to the grid 3c of thyratron 3, and the corresponding terminal of capacitor 15 is connected through a resistor 18 to the grid 4c of thyratron 4. Thus the capacitors 14 and 15 are connected from the cathode to the grid of thyratrons 3 and 4, respectively. The ohmic resistance of the resistors 12 and 13 is chosen relatively large in comparison with the reactance of the capacitors 14 and 15. As a result of this proportioning and the connections of capacitors 14 and 15 described in the foregoing, a substantially 90-degree lagging component of alternating voltage is supplied to each of the grids 3c and 4c, as illustrated in Fig. 2, in which the solid curve 19 and the dotted curve 20 represent the alternating voltages supplied to the anodes 3a and 4a of the thyratons 3 and 4, respectively, and the solid sinusoidal curve 21 and dotted sinusoidal curve 22 represent the alternating voltage components supplied to the grids 3c and 4c, respectively.

Assuming that the critical grid voltage is represented by the zero axis, and that the components of alternating voltage 21 and 22 are the only voltages applied to the grids 3c and 4c, the firing point of each of the thyratrons 3 and 4 is at the 90-degree point of the positive half-cycle of anode voltage, and each of the thyratrons will conduct for the remaining 90 degrees of the positive half-cycle of its anode voltage. In order to vary the amount of current conducted in each half-cycle thereby to vary the average current conducted, the firing point is correspondingly varied. This variation of the firing point is brought about by adding a variable component of direct voltage to the alternating component so that the resultant of the two component voltages is applied to the grids 3c and 4c.

For the purpose of supplying such component of variable direct voltage to the grids, a pair of control electric valves 23 and 24 is provided. The valve 23 is preferably a triode valve and the valve 24 is preferably a diode valve. These control valves are connected in a circuit which includes the armature 1a of the motor and which is connected across the secondary winding 16a. The circuit is traced from the upper terminal of the secondary winding 16a to the anode 23a of valve 23, cathode 23b, slider 25a of potentiometer 25, contacts of one or the other of the reversing contactors 10 and 11, armature 1a of motor 1, positive bus 6, resistor 26, anode 24a of diode valve 24, and cathode 24b to the lower terminal of the secondary winding 16a. Thus the triode valve 23 is connected in parallel circuit relationship with capacitor 14; i. e., it is connected through potentiometer 25 and armature 1a in parallel with capacitor 14 and resistor 12. Similarly, the diode valve 24 is connected in parallel circuit relationship with capacitor 15. Each of resistors 12 and 13 has an ohmic resistance which is approximately one-half the resistance of resistor 26, e. g., resistors 12 and 13 may each have 5000 ohms and resistor 26 may have 100,000 ohms.

The valves 23 and 24 are connected in series relationship with each other so that they conduct during the same half-cycle of the applied alternating voltage. In tracing the charging circuits by which a direct component is superimposed upon the alternating component supplied to the capacitors 14 and 15, a condition is assumed in which the grid voltage of triode valve 23 is at cut-off. It is also assumed that the forward reversing contactor 10 is closed. During the half cycle of alternating voltage in which the upper terminal of secondary winding 16a is positive, a charging current flows from such upper terminal through resistor 12, capacitor 14, resistor 26 and through diode valve 24 to the lower terminal of secondary winding 16a. As a result, a charge is placed on capacitor 14 which is positive at the upper terminal and negative at the lower terminal, as indicated by the dotted polarity markings. During the next half cycle of alternating voltage in which the upper terminal of winding 16a is negative, neither triode valve 23 nor diode valve 24 conducts. Since capacitor 14 is charged, a charging current flows from the upper or positive plate through resistor 12 and secondary winding 16a to the capacitor 15, thereby making its lower plate positive and its upper plate negative. The charges on both capacitors 14 and 15 become equalized and the polarities of these equalized charges are indicated by the dotted polarity markings.

For the opposite operating condition, i. e. with the triode valve 23 fully conducting, the charging circuits are traced as follows: During the half cycle of voltage in which the upper terminal of secondary winding 16a is positive, charging current flows from the upper terminal of winding 16a through triode valve 23 to slider 25a, lower portion of potentiometer 25, conductor 7a, series field winding of motor 1, contacts 10b of forward reversing contactor, armature 1a, contacts 10c of reversing contactor, to conductor 6a, capacitor 15 and resistor 13 to the lower terminal of secondary winding 16a. This charging current produces a charge on capacitor 15 of which the polarity is positive at the upper plate and negative at the lower plate. In the next half cycle of alternating voltage both valves 23 and 24 are non-conducting. The charge on capacitor 15 causes a charging current to flow to the lower plate of capacitor 14 and from the upper plate through secondary winding 16a to the lower plate of capacitor 15 until the charge on both capacitors becomes equalized. The polarities of the charges on both capacitors are indicated by the full line polarity markings. During the positive half cycle in which valve 23 is conducting, the valve 24 is also conducting and tends to charge the capacitors to the polarity indicated by the dotted line polarity markings. However, since the resistance of resistor 26 is large in comparison with resistor 13, the current conducted by the triode valve 23 is correspondingly large in comparison with the current conducted by valve 24. Consequently the net charges on the capacitors have the polarities indicated by the full line polarity markings.

If the grid voltage of the triode valve is made more negative until the conduction of both valves 23 and 24 is substantially equal, the charge which valve 24 tends to place upon the capacitors as represented by the dotted line polarity markings is equal and opposite to the charge which valve 23 tends to place on them. Consequently the net D.-C. charge is zero. For intermediate values of conduction by triode valve 23 the net D.-C. charges on the capacitors have corresponding intermediate values and the polarities of such charges depend upon the relative amounts of current conducted by the valves 23 and 24. Thus, at a predetermined high value of current conducted by the triode valve, a negative component of direct voltage having a magnitude represented by the ordinate of the horizontal line 27 of Fig. 2 is applied to the grids 3c and 4c. The actual voltage applied to the grids is the resultant of the alternating and direct components. The resultant voltage applied to the grid 3c is represented by a sinusoidal curve 28, and the resultant voltage applied to grid 4c is represented by the sinusoidal curve 29. Neither of these resultant grid voltages becomes more positive than the critical grid voltage (assumed to be the zero axis) at any time during the positive half-cycle of anode voltage, and consequently, the average current conducted by both thyratrons is substantially zero. Likewise, at a predetermined low conductivity of the triode valve, a positive component of direct voltage of which the magnitude is represented in Fig. 2 by the ordinate of the horizontal line 30 is applied to the grids 3c and 4c. The resultant voltages on the grids 3c and 4c, respectively, are represented by the sinusoidal curves 31 and 32. These resultant voltages are more positive than the critical grid voltage at the beginning of the positive half-cycle of anode voltage. Consequently, the thyratrons 3 and 4 conduct throughout the positive half-cycle of anode voltage and the average current conducted is maximum. For intermediate values of current conducted by the triode valve, corresponding intermediate average values of current are conducted by the thyratrons.

Thus, increasing the conductivity of the triode valve retards the firing point of the thyratrons and correspondingly decreases the rectified voltage and current supplied to the motor. Similarly, decreasing the conductivity of the triode valve advances the firing point of the thyratron valves and correspondingly increases the voltage and current supplied to the motor.

In order to regulate the speed of the motor 1, the voltage of the grid 23c of the triode valve is controlled by a signal voltage which is a function of the motor speed. With constant excitation supplied to the field winding 1b, the terminal voltage of the armature is an approximation of the motor speed. To hold the speed of the motor approximately constant, the armature voltage is compared to a constant reference voltage, and the difference of the signal voltage and the reference voltage is applied to the grid-cathode circuit of the triode valve 23 which controls the firing point of the thyratrons 3 and 4 in such a manner as to maintain the difference voltage approximately zero or slightly negative. In order that this difference voltage may be held approximately zero, the signal voltage must have the correct "sense," i. e., the signal voltage must make the grid of the triode valve 23 positive when the armature voltage becomes greater than the reference voltage. This is accomplished by connecting the cathode 23b of the triode valve 23 to the reference voltage source and connecting the grid 23c so that a voltage proportional to the armature terminal voltage is applied to the grid. To this end, the cathode 23b of the triode valve is connected to the slider of the potentiometer 25 which is connected across the source of reference voltage 7—8a when either of the reversing switches 10 or 11 is closed. Similarly, the grid 23c of the valve 23 is connected to the slider 34a of a potentiometer 34 which, together with the fixed resistors 35 and 36 and the active portion of a potentiometer 37, constitutes a voltage divider connected across the positive and negative buses 6 and 7. Thus, the portion of the field voltage between the negative bus 7 and the slider 25a becomes the reference voltage, and the portion of the armature terminal voltage between the negative bus 7 and the slider 34a is the signal voltage which is compared with the reference voltage by means of the valve 23.

Since both the reference voltage and the armature voltage are unfiltered, the grid-to-cathode voltage of the valve 23 must be well filtered by means of the high resistance in voltage divider 34, 35, 36, and 37 and the capacitor 38 between the grid and cathode of the triode valve.

In order to limit the current supplied by the thyratrons 3 and 4 to the armature 1a of the motor, an additional triode valve 39 is connected in parallel with the triode valve 23. Its input circuit is connected to respond to a predetermined maximum current supplied to the armature. This current signal is obtained by means of a current transformer 40, of which the two primary windings 40a and 40b are connected in the two anode circuits of the armature thyratrons 3 and 4. The secondary winding 40c is loaded to give the desired value of volts per ampere of the primary winding and connected to a full-wave diode rectifier valve 41. The rectified voltage is applied across the fixed resistor 42 and the potentiometer 37. The portion of this rectified voltage which appears across the fixed resistor 42 is applied to the grid of the auxiliary triode valve 39. The cathode of this valve is connected to an intermediate point on the voltage divider which comprises the fixed resistors 43 and 44 connected across the source of reference voltage 7—8a; and thus a portion of the fixed reference voltage is applied to the cathode of the valve 39. When the armature current is low, the grid voltage of the valve 39 is so negative that the valve 39 is at cutoff and thus has no effect on the voltage regulating action of the valve 23. If the grid voltage of the current limit valve 39 is permitted to become excessively negative beyond the cutoff value during periods of low armature current, it cannot rise instantly to turn the valve on if an overload is suddenly applied to the motor, owing to the time constant of the filter circuit comprising the resistor 46 and the capacitor 47. To minimize this delay, the grid of the current limit valve, i. e., the point 46a is prevented from becoming more negative than just slightly below cutoff by means of the triode valve 48 which is connected as a diode. When the current signal voltage at the point 42a becomes more negative than the voltage of the point 45a on the reference voltage divider, the triode valve 48 conducts current through the resistor 46, thereby preventing the point 46a from becoming appreciably more negative than the point 45a. This prevents the capacitor 47 from being charged much beyond the cutoff point of the current limit valve 39, so that if the armature current suddenly increases, the charge on the capacitor 47 can change in a very short time, thereby to render the current limiting valve 39 effective.

The value of the current limit is changed for different motors by means of the tap switch 49 which changes the loading on the secondary winding 40c of the current transformer.

It is desirable that the armature thyratrons 3 and 4 be phased to cutoff when the motor is stopped so that when the speed control potentiometer 25 is preset for a high speed and the start button is operated, the stalled motor armature will not be subjected to the full rectifier voltage. Also, on reversing the motor, it is desirable that the firing point of the thyratrons be retarded nearly to cutoff before the reverse contacts are closed. This is accomplished by including the operating coil 9a of the sequencing contactor 9 in series with the voltage divider 43, 44, 45 which provides the reference voltages for the speed control valve 23 and the current limit valve 39. The contacts of the reversing contactors 10 and 11 which open the circuit of the operating coil 9a reduce the reference voltages for the valves 23 and 39 to zero. This reduces the cathode voltage of both valves 23 and 39 to zero so that these valves are fully conducting and the thyratrons 3 and 4 are at cutoff. A normally closed contact 9b of the sequencing relay 50 is connected in series with the pick-up circuit of the reverse contactor so that the sequencing relay must drop out before the reverse contacts can be closed. The drop out time of the sequencing relay gives a slight additional time for the valves 23 and 39 to cut off the thyratrons before the reverse contacts are closed.

With the foregoing understanding of the elements and their organization, the operation of the system itself will readily be understood from the following detailed description.

The slider 25a of the speed adjusting potentiometer 25 is set at a point corresponding to the speed at which it is desired to operate the motor 1. Assuming that it is desired to operate the motor in the forward direction, the forward push-button switch 51 is depressed to complete an energizing circuit for the operating coil 10a of the forward contactor. In response to energization, the forward contactor 10a closes its main normally open contacts 10b and 10c to connect the armature 1a of the motor 1 to the rectifier buses 6—7 for operation in the forward direction. Simultaneously, the forward contactor closes its normally open interlock contacts 10d, 10e and opens its normally closed dynamic braking contacts 10f and normally closed interlock contacts 10g. The contacts 10e in closing complete a sealing-in circuit in parallel with the contacts of the forward push-button switch 51 which now may be released. The dynamic braking contacts 10f in opening interrupt the dynamic braking circuit through the dynamic braking resistor 52 in parallel with the armature 1a.

The interlock contacts 10d in closing complete an energizing circuit for the operating coil 9a of the sequencing contactor 9 which, in response to energization opens its normally closed contacts 9b. The contacts 10d in closing also apply the reference voltage to the speed adjusting potentiometer 25 and the voltage divider 43, 44, 45. At this point in the operation, the voltage across the motor armature 1a is very low, and consequently, the voltage applied to the grid 23c of the triode valve 23 is quite low; i. e., it is almost at the potential of the negative bus 7. On the other hand, owing to the setting of the slider 25a on the potentiometer 25, the voltage of the cathode 23b is much more positive than the voltage of the grid with the result that the valve 23 is nonconducting, or conducting a very small amount of current. As a result, the grid voltage of the thyratrons 3 and 4 tends to be advanced. However, owing to the capacitor 47 between the cathode 39b and the grid 39c of the current limit valve 39, the application of reference voltage to the voltage divider 43, 44, 45 does not immediately make the voltage of the cathode 39b positive with respect to the voltage of the grid. Consequently, the valve 39 is at first conducting, with the result that the thyratrons 3 and 4 are turned off. As the charge on the capacitor 47 builds up, the voltage of the grid 39c gradually becomes more negative than the voltage of the cathode, thereby gradually rendering the valve 39 nonconducting and gradually advancing the firing point of the thyratrons 3 and 4.

As the armature current increases, the voltage drop across the resistor 42 increases until the current signal voltage at the point 46a is nearly equal to the reference voltage applied to the cathode 39b. At this point, the current limiting feature of the circuit becomes effective and continues the acceleration of the motor at the current limit until the speed preset on the speed adjusting potentiometer 25a is attained. As the preset speed is attained, the signal voltage derived from the armature and applied to the grid of the speed controlling valve 23 becomes sufficiently positive with respect to the reference voltage applied to the cathode 23b to increase the conductivity of the valve 23 and thereby retard the firing point of the thyratrons. Thus control is taken away from the current limit circuit when the preset speed is attained. With the completion of the acceleration of the motor, the armature current falls off to that value required to drive the load at the preset speed. As a result, the voltage drop across the resistor 42 in the current limit circuit decreases and the valve 39 becomes nonconducting. However, any tendency of the armature current to increase beyond the current limit, owing to a sudden increase in load or other cause, increases the voltage drop across the resistor 42, thereby increasing the grid voltage of the current limit valve 39 to render the valve 39 conducting and thereby retard the firing point of the thyratrons 3 and 4.

If owing to some change in load or other cause, the speed of the motor should tend to increase above the preset value, the signal voltage applied to the grid 23c of the speed controlling valve 23 is increased correspondingly, thereby increasing the conductivity of the valve 23 and retarding the firing point of the thyratrons. This causes the voltage supplied to the armature to be decreased until a condition of equilibrium is reached with the speed of the motor corresponding to the value preset on the speed presetting potentiometer 25. Similarly, if the speed of the motor tends to decrease below the preset value, the signal voltage applied to the grid 23c decreases, thereby decreasing the conductivity of the valve 23 and correspondingly advancing the firing point of the thyratrons. This continues until a condition of equilibrium is reached with the speed of the motor corresponding to the value preset on the speed presetting potentiometer.

When a motor is loaded, its armature terminal voltage is not a true measure of its speed, since the terminal voltage differs from the countervoltage (which is a true measure of the speed) by an amount proportional to the RI voltage drop in the armature. Consequently, if the speed of the motor 1 is to be regulated accurately to the preset value, it is necessary to compensate the signal voltage applied to the grid of the valve 23 for the voltage drop in the armature produced by the load. To this end, a portion of the voltage proportional to armature current from the current transformer 40 is applied across the potentiometer 37. By means of the potentiometer 37, an adjustable portion of this voltage is added in series with the voltage across the signal voltage divider 35, 34, 36. As the motor armature current increases its load, the voltage at the slider 37a becomes negative with respect to the voltage of the negative bus 7. This decreases the grid voltage of the valve 23, thereby decreasing its conductance and advancing the firing point of the thyratrons 3 and 4 until the armature voltage rises sufficiently to restore the grid voltage of the valve 23 to its equilibrium operating value. This rise in armature voltage is proportional to the change in the voltage between the slider 37a and the negative bus 7. By adjustment of the slider 37a, this armature voltage increase with current can be made to equal the corresponding change in the RI drop of the motor armature, thereby maintaining the speed approximately constant with change in motor load. By overcompensating, the speed can even be made to rise with the load.

To stop the motor, the stop push-button switch 53 is depressed to interrupt the energizing circuit for the operating coil 10a of the forward contactor 10. In response to deenergization, the forward contactor drops out to open its normally open contacts 10b, 10c, 10d, and 10e and to close its normally closed contacts 10f and 10g. Contacts 10f in closing complete a dynamic braking circuit for the armature 1a through the dynamic braking resistor 52. As a result, a large braking torque is developed which rapidly brakes the motor to rest. Contacts 10d in opening interrupt the energizing circuit for the operating coil 9a of the sequencing contactor 9 and also remove the reference voltage from the cathodes 23b and 39b of the speed controlling valve 23 and the current limit valve 39. As a result, the voltages of these cathodes are decreased to the value of the voltage at the negative bus 7, thereby rendering the valves 23 and 39 conducting and retarding the firing point of the thyratrons 3 and 4 to leave the system in a reset condition.

Although in accordance with the provisions of the patent statutes, this invention is described as embodied in concrete form and the principle thereof has been explained together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination, a pair of electric valves each provided with an anode, a cathode and a control grid, a source of alternating voltage, connections from said source to said anodes and cathodes for supplying alternating voltages thereto, a pair of capacitors each connected between the grid and cathode of a corresponding one of said valves, a control circuit comprising said capacitors connected in series with each other to said source for supplying a dephased component of alternating voltage to said grids, a second circuit comprising two electric control valves connected in series with each other to said source, a connection from the common terminal of said control valves to the common terminal of said capacitors for connecting each of said valves in parallel with a corresponding one of said capacitors to supply a component of direct voltage to each of said grids, and means for varying the firing point of said first pair of valves to vary the current in the output circuit thereof comprising means for varying the relative conductivities of said control valves.

2. A control system comprising in combination, a pair of electric valves each provided with an anode, a cathode and a control grid, a source of alternating voltage, connections from said source to said anodes and cathodes for supplying alternating voltages thereto, means for supplying substantially 90 degree lagging components of alternating voltage to said grids comprising a pair of capacitors of relatively small capacitance each connected between the grid and cathode of a corresponding one of said valves, a series circuit connected across said source and comprising two resistors of relatively large resistance and said capacitors connected between said resistors, a second circuit comprising a pair of control electric valves connected in series with each other across said source and a connection from the common terminal of said control valves to the common terminal of said capacitors, and means for varying the firing point of said first pair of valves to vary the output current thereof comprising means for varying the relative conductivities of said control valves thereby to vary said direct voltage components.

3. A control system comprising a pair of electric valves each provided with an anode, a cathode, and a control grid, a source of alternating voltage, connections from said source to said anodes and cathodes for supplying alternating voltages thereto, means for supplying dephased components of alternating voltage to said grids comprising a first series circuit supplied from said source including two resistors and two capacitors connected between said resistors and connections from each of said capacitors to the grid and cathode of a corresponding one of said valves, means for applying a component of direct voltage to each of said grids comprising a second series circuit supplied from said source and including a pair of control valves connected in series with each other and a connection from a point in said second circuit between said control valves to a point in said first circuit between said capacitors for connecting each of said control valves in parallel with a portion of said first circuit containing a corresponding one of said capacitors, and means for varying the firing point of said first pair of valves to vary the output current thereof comprising means for varying the relative conductivities of said control valves thereby to vary said direct voltage components.

4. A control system comprising in combination, a pair of electric valves each provided with an anode, a cathode and a control grid, a source of alternating voltage, connections from said source to said anodes and cathodes for supplying alternating voltages thereto, means for supplying dephased components of alternating voltage to said grids comprising a pair of capacitors each connected between the grid and cathode of a corresponding one of said valves, a series circuit connected across said source and comprising two resistors and said capacitors connected between said resistors, a second circuit comprising a pair of control electric valves connected in series with each other across said source and a connection from the common terminal of said control valves to the common terminal of said capacitors for supplying a component of direct voltage to each of said grids, one of said control valves being a triode valve, means for supplying a control voltage to the grid and cathode of said triode valve, and means for varying the firing point of said first pair of valves to vary the output current thereof comprising means for varying the grid to cathode voltage of said triode valve thereby to vary said component of direct voltage and to reverse the polarity in accordance with the relative conductivities of said control valves.

5. A control system comprising in combination, a pair of electric valves each provided with an anode, a cathode and a control grid, a source of alternating voltage, connections from said source to said anodes and cathodes for supplying alternating voltages thereto, means for supplying dephased components of alternating voltage to said grids comprising a pair of capacitors each connected between the grid and cathode of a corresponding one of said valves, a series circuit connected across said source and comprising two resistors and said capacitors connected between said resistors, a second circuit comprising a pair of control electric valves connected in series with each other across said source and a connection from the common terminal of said control valves to the common terminal of said capacitors for supplying a component of direct voltage to each of said grids, means for varying the firing point of each of said first pair of valves to vary the current in the output circuit thereof comprising means for varying the relative conductivities of said control valves, and means for limiting the output current of said first pair of valves to a predetermined value comprising a third control valve having an output circuit connected in parallel with one of said pair of control valves and having an input circuit connected to be responsive to said output current of said first pair of valves.

6. A system for controlling the operation of an electric motor comprising a pair of electric valves each provided with an anode, a cathode and a control grid for controlling the supply of current to said motor, a source for supplying alternating voltages to the anodes of said valves, means for supplying a component of dephased alternating voltage to said grids comprising a pair of capacitors each connected between the grid and cathode of a corresponding one of said valves, a control circuit comprising said capacitors connected in series with each other to said source for supplying a dephased component of alternating voltage to said grids, a second circuit comprising two electric control valves connected in series with each other to said source, a connection from the common terminal of said control valves to the common terminal of said capacitors for connecting each of said control valves in parallel with a corresponding one of said capacitors to supply a component of direct voltage to each of said grids, and means for varying the firing point of said first pair of valves to vary the current supplied to said motor comprising means for varying the relative conductivities of said control valves.

7. A system for controlling the operation of an electric motor comprising a pair of electric valves each provided with an anode, a cathode and a control grid for controlling the supply of current to an electric motor, a source of alternating voltage, connections from said source to said anodes and cathodes for supplying alternating voltages thereto, means for supplying a component of substantially 90 degrees dephased alternating voltage to said grids comprising a resistance-reactance circuit supplied from said source including a pair of capacitors having a reactance that is small relative to the resistance of said circuit, and connections from each of said capacitors to the grid and cathode of each of said valves, means for supplying a component of direct voltage to said grids comprising a second circuit supplied from said source and including a pair of control electric valves connected in series with each other and a connection from a point in said second circuit between said control valves to a point in said resistance-reactance circuit between said capacitors for connecting each of said control valves in a circuit in parallel with a portion of said resistance-reactance circuit containing a corresponding one of said capacitors, and means for varying the firing point of said first pair of valves to vary the current supplied to said motor comprising means for varying the relative conductivities of said control valves.

8. A system for controlling the operation of an electric motor comprising a pair of electric valves each provided with an anode, a cathode and a control grid for controlling the supply of current to said motor, a source for supplying alternating voltages to the anodes of said valves, means for supplying a component of dephased alternating voltage to said grids comprising a pair of capacitors each connected between the grid and cathode of a corresponding one of said valves, a control circuit comprising said capacitors connected in series with each other to said source for supplying a dephased component of alternating voltage to said grids, a second circuit comprising two electric control valves connected in series with each other to said source, a connection from the common terminal of said control valves to the common terminal of said capacitors for supplying a component of direct voltage to each of said grids, means for varying the firing point of said first pair of valves to vary the current supplied to said motor comprising means for varying the relative conductivities of said control valves, and means for limiting the current supplied to said motor comprising a third control valve having its output circuit connected in parallel with the output circuit of one of said pair of control valves and having its input circuit connected to be responsive to the current supplied to said motor.

9. A system for controlling the operation of an electric motor comprising a pair of electric valves each provided with an anode, a cathode, and a control grid for controlling the supply of current to the motor, a source of alternating voltage, connections from said source to said anodes and cathodes for supplying alternating voltages thereto, means for supplying a component of alternating voltage to said grids comprising a first circuit supplied from said source and having a pair of series connected capacitors each having connections to the grid and cathode of a corresponding one of said valves, means for supplying a component of direct voltage to said grids comprising a second circuit supplied from said source and including a pair of series connected control electric valves and a connection from a point in said second circuit between said control valves to a point in said first circuit between said capacitors for connecting each of said control valves in parallel with a portion of said first circuit containing a corresponding one of said capacitors, one of said control valves being a triode valve, motor speed presetting means comprising means for producing an adjustable control voltage, means for producing a signal voltage proportional to the speed of said motor, and connections for supplying the difference of said control and signal voltages to the grid cathode circuit of said triode valve.

10. A system for controlling the operation of an electric motor comprising a pair of electric valves each provided with an anode, a cathode, and a control grid for controlling the supply of current to the motor, a source of alternating voltages, connections from said source to said anodes and cathodes for supplying alternating voltages thereto, means for supplying a component of alternating voltage to said grids comprising a first circuit supplied from said source and having a pair of series connected capacitors each having connections to the grid and cathode of a corresponding one of said valves, means for supplying a component of direct voltage to said grids comprising a series circuit supplied from said source and including the armature of the motor and a pair of control electric valves and a connection from a point in said second circuit between said control valves to a point in said first circuit between said capacitors for connecting each of said control valves in parallel circuit with a portion of said first circuit containing a corresponding one of said capacitors, one of said control valves being a triode valve, motor speed presetting means comprising means for producing an adjustable reference control voltage, means for producing a signal voltage proportional to the speed of said motor, connections for supplying the difference of said reference and signal voltages to the grid cathode circuit of said triode valve thereby to vary the firing point of said first pair of valves to effect operation of said motor at a speed proportional to said reference voltage, and means for limiting the current supplied to said motor comprising a third control valve having its output circuit connected in parallel with the output circuit of one of said pair of control valves and having its input circuit connected to be responsive to the current supplied to said motor.

HENRY H. LEIGH.

REFERENCES CITED

The following references are of record in the file of this patent:

UNITED STATES PATENTS

| Number | Name | Date |
|---|---|---|
| 1,943,088 | Power | Jan. 9, 1934 |
| 2,243,572 | Moyer et al. | May 27, 1941 |
| 2,278,212 | Moyer | Mar. 31, 1942 |
| 2,300,960 | Porter | Nov. 3, 1942 |
| 2,312,117 | Moyer et al. | Feb. 23, 1943 |
| 2,400,599 | Reeves | May 21, 1946 |

Certificate of Correction

Patent No. 2,494,340

January 10, 1950

HENRY H. LEIGH

It is hereby certified that error appears in the printed specification of the above numbered patent requiring correction as follows:

Column 10, line 49, after the word "in" insert *a circuit in*;

and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*